May 24, 1966
F. B. BURNS
3,252,822
METHOD OF MAKING A BITUMINOUS COATED SHEET
OF SYNTHETIC MINERAL WOOL FIBERS
Original Filed Feb. 11, 1957
6 Sheets-Sheet 1
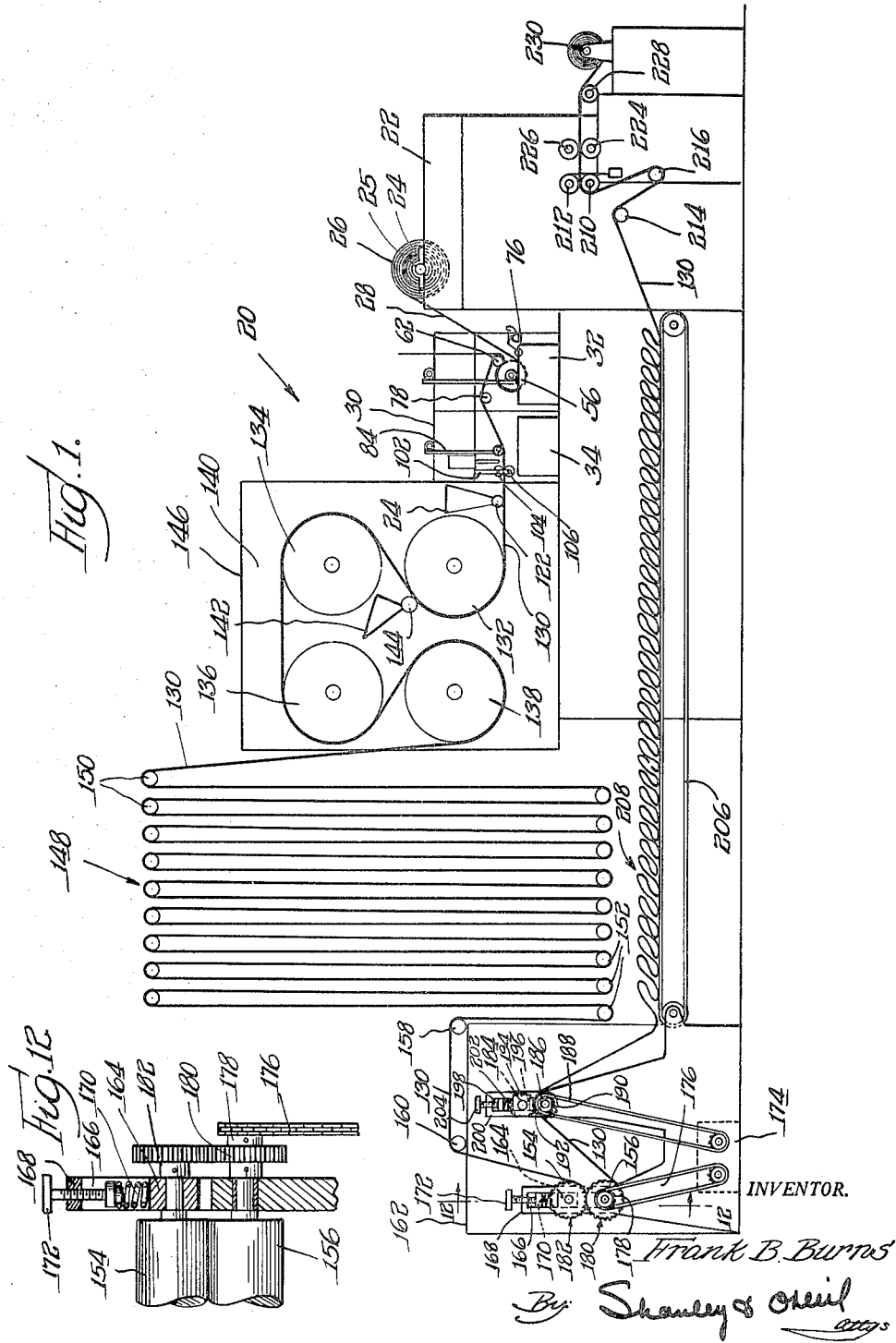
INVENTOR.
Frank B. Burns
By Shanley & O'Neil
attys

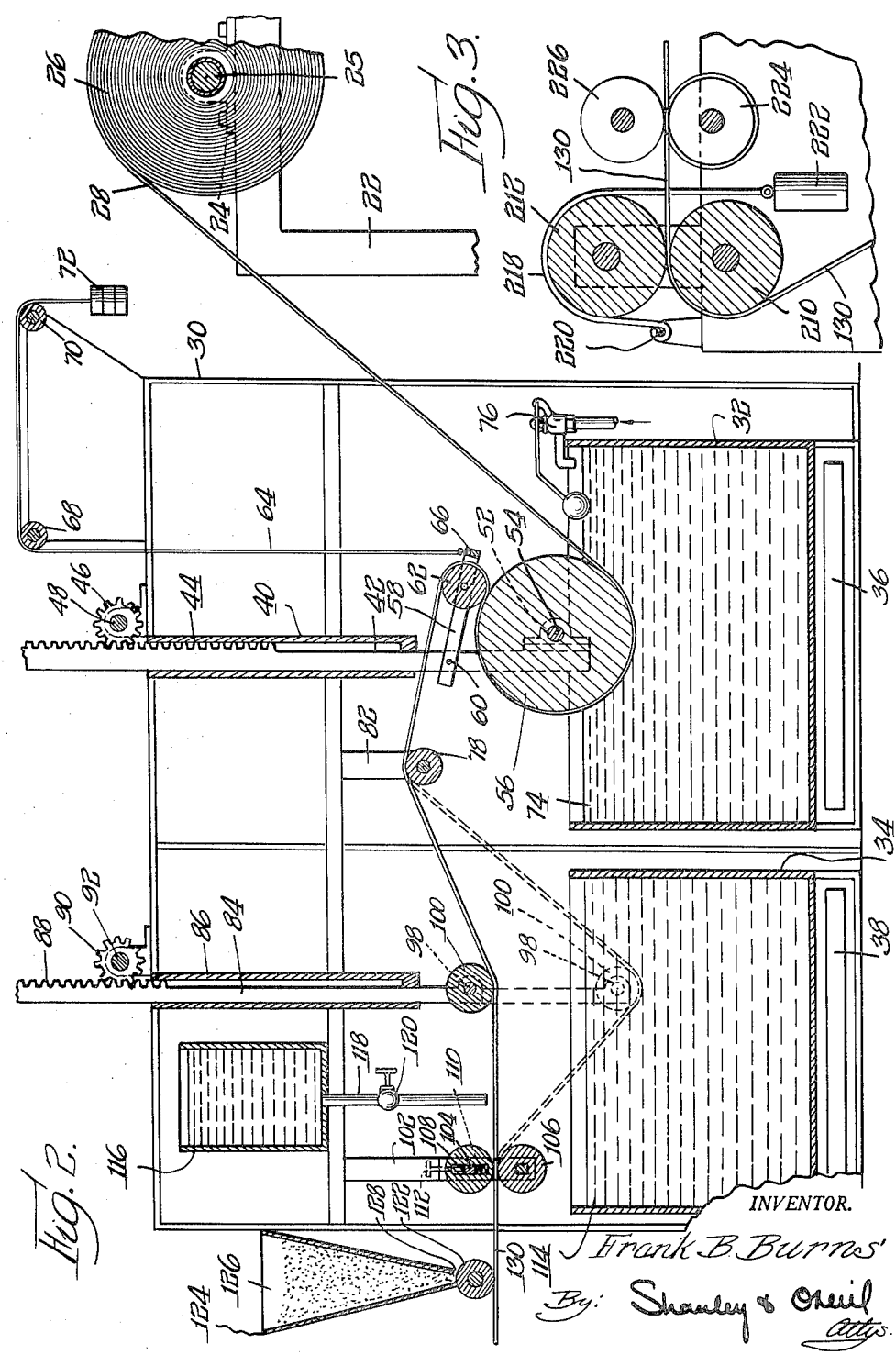

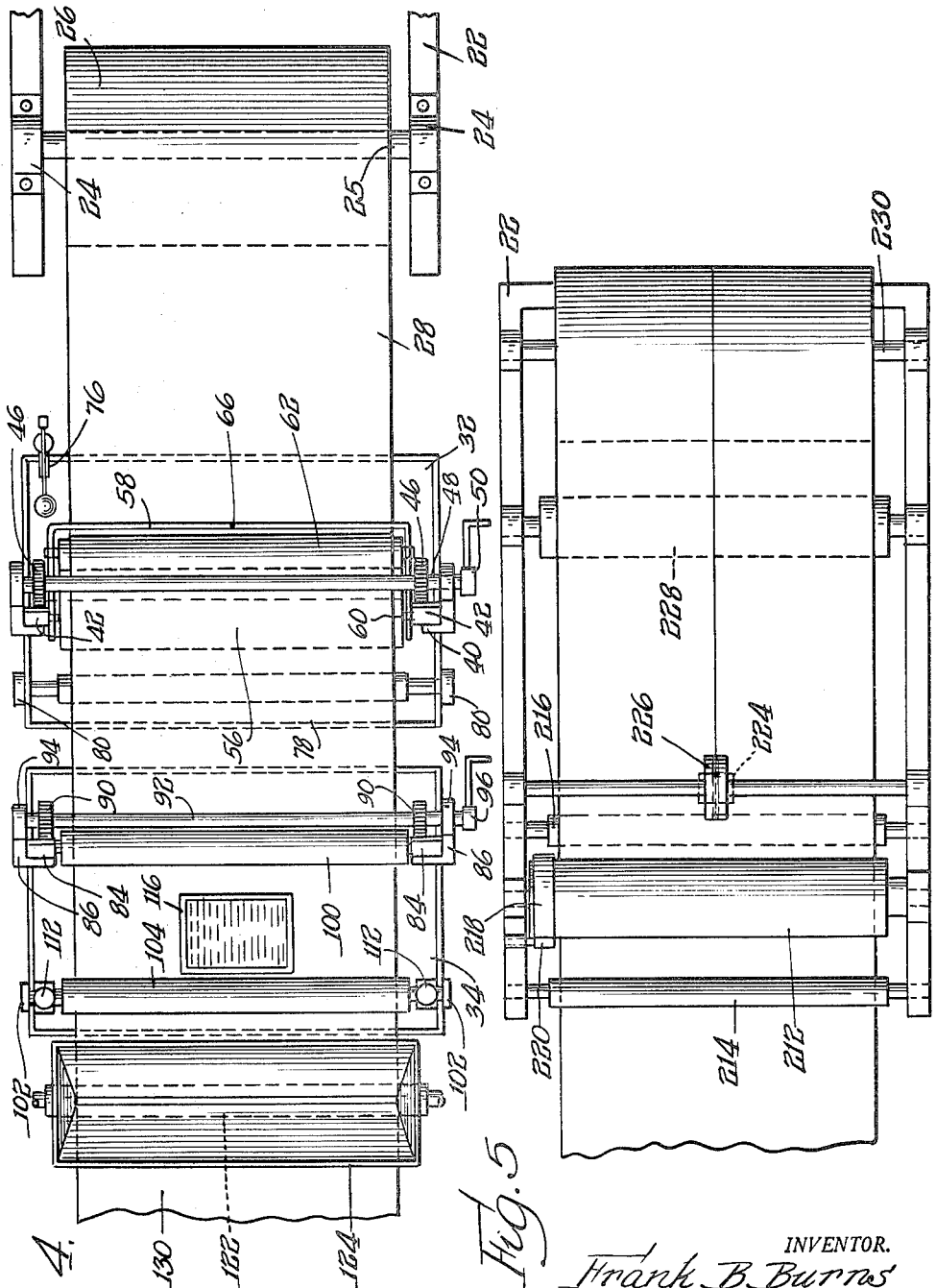

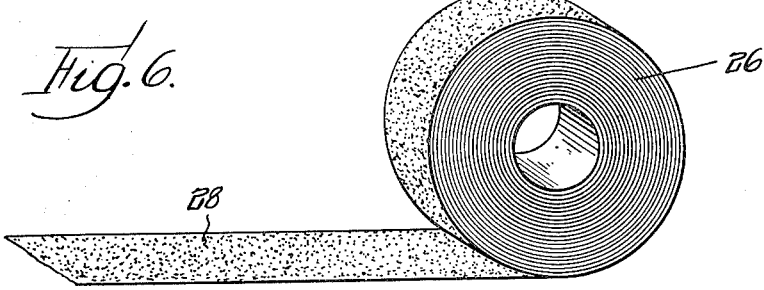
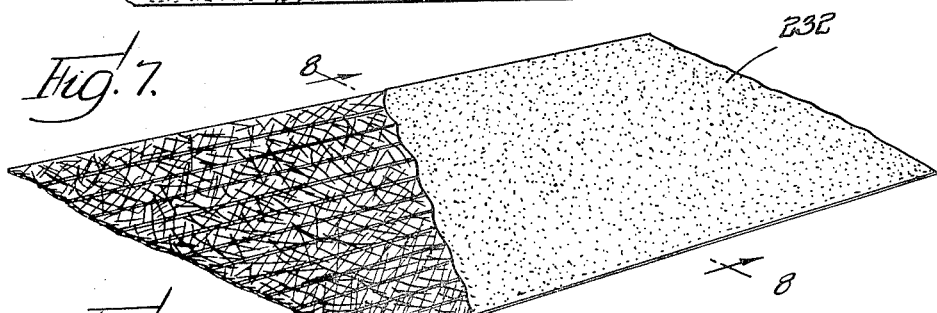
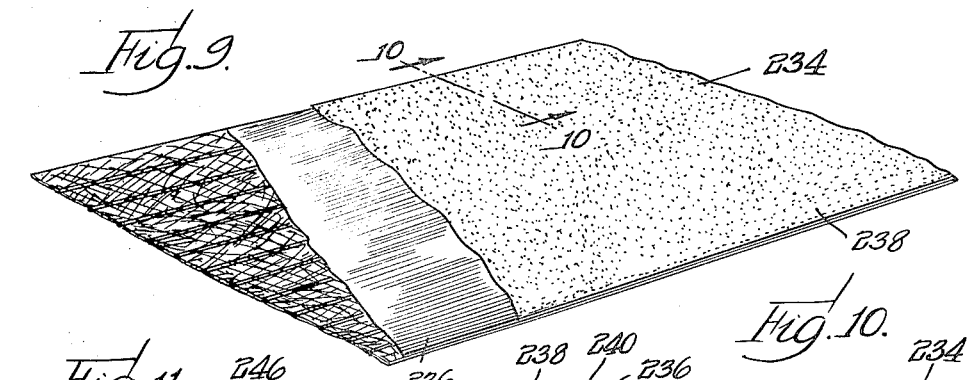
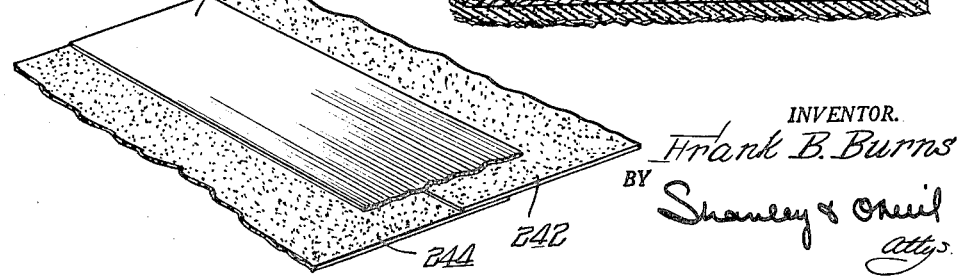

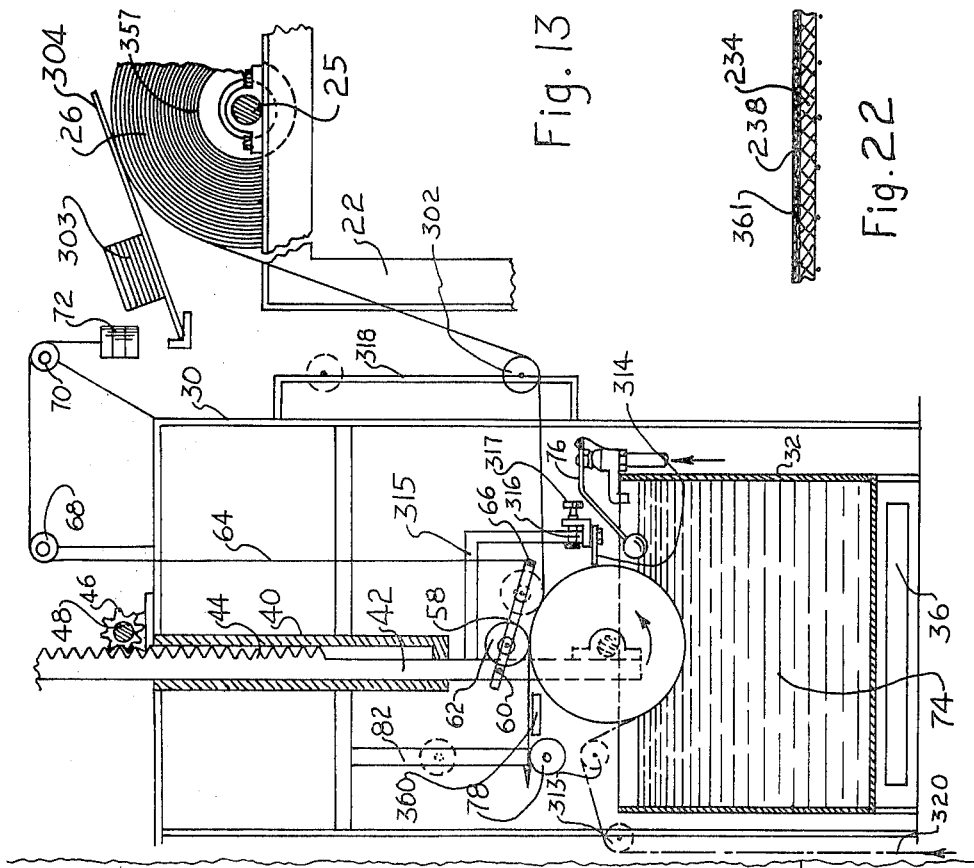
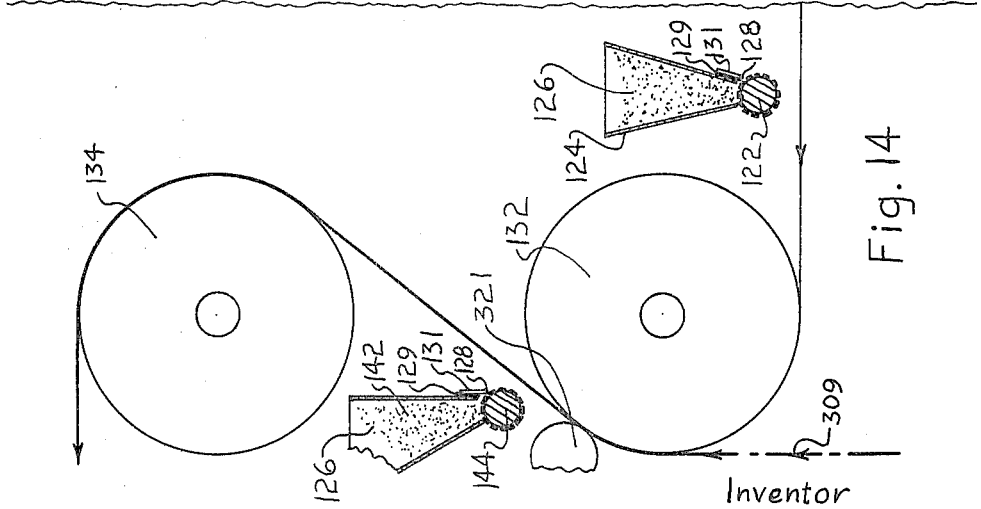

May 24, 1966  F. B. BURNS  3,252,822
METHOD OF MAKING A BITUMINOUS COATED SHEET
OF SYNTHETIC MINERAL WOOL FIBERS
Original Filed Feb. 11, 1957  6 Sheets-Sheet 6

Inventor
Frank B. Burns
By Shanley & O'Neil
Attys.

United States Patent Office 3,252,822
Patented May 24, 1966

3,252,822
METHOD OF MAKING A BITUMINOUS COATED SHEET OF SYNTHETIC MINERAL WOOL FIBERS
Frank B. Burns, Wynnewood, Okla., assignor to Kerr-McGee Oil Industries, Inc., a corporation of Delaware
Continuation of abandoned application Ser. No. 639,584, Feb. 11, 1957. This application Feb. 26, 1962, Ser. No. 175,894
14 Claims. (Cl. 117—30)

This invention relates to resinous sheet materials, preferably bituminous in nature, more particularly it relates to sheet materials comprising a base sheet of synthetic mineral wool fibers, preferably glass, coated or saturated with a bituminous composition, the preferred bituminous material being asphalt.

This application is a continuation of my copending application Serial No. 639,584, filed February 11, 1957, now abandoned, for "Bituminous Coated Article and Method of Making Same," which, in turn, is a continuation-in-part of my application Serial No. 232,544, filed June 20, 1951, now abandoned.

Bituminous sheet materials having felt bases are widely used, for example, as protective wrappings on metallic pipe such as iron or steel to be laid in the ground, as roofing materials and for many other uses. Such materials, however, have recognized deficiencies arising largely from the inherent characteristics of the felt base, such as low tensile strength, a tendency toward wicking and the like.

Synthetic mineral wool fiber mats or felts which might replace the asbestos felt base heretofore used lack many of the inherent undesirable characteristics of the asbestos felt base in that they have very high uniform tensile strengths, are not subject to wicking, have very low moisture pick-up and other advantageous properties including all those of the asbestos felt bases. Attempts to substitute the glass fiber mats for the asbestos felts have not heretofore produced satisfactory sheet materials, however. For example, application to glass fiber mat material of the asphalt composition usually applied to asbestos felts in making pipeline felts produces an inferior and unsatisfactory product. Because of the extensive voids in the glass fiber mats and the softness of the asphalt or tar saturants in general use, the hot pipeline enamels applied in wrapping pipe flowed through the wrap before the enamel could set up so that the glass fiber mat wrap was a failure. Substitution of a harder or a higher softening point saturant did not in itself solve the problem because the resulting sheet was so non-porous as to be unsatisfactory on that count. Furthermore, it could not be used satisfactorily as a base upon which to coat a different asphalt composition to form roofing material and the like because so much of the saturant remained on the glass fiber mat that it exuded when the hot coating compound was applied and prevented the coating compound from bonding to the mat. Further, the use of said bituminous saturated and coated glass fiber mats or sheets to build laminated articles has not been too readily accomplished as the coating has not heretofore been keyed to the fiber.

It is an object of this invention to provide an improved manufactured article comprising a bonded synthetic mineral wool fiber sheet containing a resinous composition keyed to said sheet.

It is an object of this invention to provide an improved pipe wrap comprising a synthetic bonded mineral wool fiber sheet, preferably glass base saturated with a resinous (preferably selected from the bitumens consisting of asphalt) material and to provide a method for making such pipe wrap.

A further object is to provide an improved pipe wrap comprising a synthetic mineral wool fiber sheet, preferably glass, base coated with a bituminous, preferably asphalt, material and having a porosity which permits gases trapped in the wrapping operation to escape but retains the enamel and to provide a method for making such pipe wrap.

Still another object is to provide an improved sheet material comprising a synthetic mineral wool fiber sheet, preferably glass, base coated with bituminous, preferably asphalt, material, which sheet can be finished thereafter as a pipe wrap or a waterproofing or a roofing membrane or coated with a different asphalt composition to form an improved sheet suitable for use as roofing or in lining canals or for other similar uses and to provide a method of making such an improved sheet.

A still further object is to provide an improved bituminous, preferably asphalt, sheet material having a synthetic mineral wool fiber sheet, preferably glass, base and useful for roofing, lining canals and the like and to provide a method for making such a sheet.

A still further object is to provide improved apparatus for making a bituminous sheet material having a synthetic mineral wool fiber sheet base.

Still another object is to provide improved apparatus for making bituminous sheet material having a synthetic mineral wool fiber sheet base in a continuous strip.

Still another object is to provide an improved apparatus for making bituminous sheet material having a synthetic mineral wool fiber sheet base and a porosity which permits full release of gases trapped when said sheet is wrapped on a pipe but retains the pipeline enamel employed therewith.

Still another object is to provide an improved apparatus for making bituminous sheet material having a synthetic mineral wool fiber sheet base saturated and subsequently coated with a different bituminous material.

Still another object is to provide a bituminous sheet material having a synthetic mineral wool fiber sheet base the sections of which are spliced together to form a continuous sheet in such a way that the portion of the sheet containing the splice is usable for the same purposes as the remainder of the sheet.

Still another object is to provide an improved method for splicing together strips of synthetic mineral wool fiber sheet material to be used as a base for a bituminous sheet material.

A further object of this invention is to provide an outer pipeline wrapping felt having a continuous lengthwise synthetic mineral wool yarn reinforcing embedded therein, said reinforcing preferably comprising a plurality of parallel spaced strands of yarn.

Still another object of the invention is to provide an outer pipeline wrapping felt having a porosity which permits full release of gases trapped when said felt is wrapped on a pipe but retains the pipeline enamel employed therewith.

A still further object of this invention is to provide novel laminated articles containing at least one bonded synthetic mineral wool fiber sheet or mat containing a resinous material keyed therein.

Other objects will appear hereinafter.

It has been found that the foregoing objects are accomplished by the articles, processes and apparatus to be described and which, so far as their nature admits, are illustrated in the accompanying drawings which form a part of this specification and in which:

FIGURE 1 is a somewhat diagrammatic view in elevation of an apparatus for making a bituminous sheet material embodying the features of the present invention;

FIGURE 2 is an enlarged detailed view partly in vertical cross-section along the longitudinal center of the apparatus illustrated in FIGURE 1, showing a portion of the apparatus illustrated in greater detail;

FIGURE 3 is an enlarged detailed view of the slitting mechanism;

FIGURE 4 is a plan view of the portion of the apparatus shown in FIGURE 2;

FIGURE 5 is a plan view of the slitting mechanism shown in FIGURE 3 and of the reel for winding the finished material;

FIGURE 6 is a view in perspective of the fiber glass mat base in roll form as employed in the apparatus illustrated in FIGURE 1;

FIGURE 7 is a view in perspective of a section of the pipe wrap embodying the features of the present invention;

FIGURE 8 is an enlarged detailed view in cross-section of the pipe wrap taken on the line 8—8 in FIGURE 7;

FIGURE 9 is an enlarged detailed view in perspective showing a section of an asphalt sheet material comprising a glass fiber sheet base saturated with one bituminous material and coated with a different one;

FIGURE 10 is an enlarged detailed view in cross-section on the line 10—10 in FIGURE 9;

FIGURE 11 is an enlarged perspective view illustrating the splicing of two sections of glass fiber mat;

FIGURE 12 is an enlarged detailed view, partly in cross-section on the line 12—12 in FIGURE 1;

FIGURE 13 is an enlarged detailed view in elevation of an apparatus showing the straight-through threading of the sheet through the saturation zone;

FIGURE 14 is an enlarged detailed view of the cooling drums showing another embodiment of the lamination apparatus;

FIGURE 22 is an enlarged detailed view of the cross-section of the pipe wrap of FIGURE 8 showing a kraft paper laminated thereto.

Figure 21:
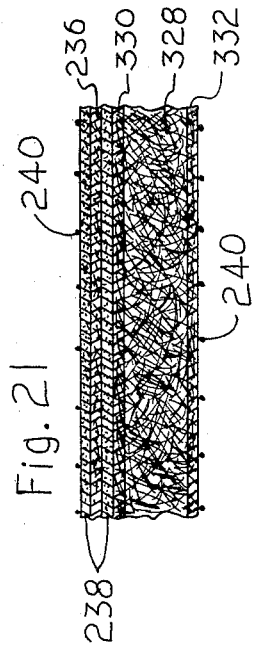
FIGURE 21 is a perspective view of the saturated shield of FIGURE 20 which has been laminated with an armor plating member laminated thereto.
Figure 15:
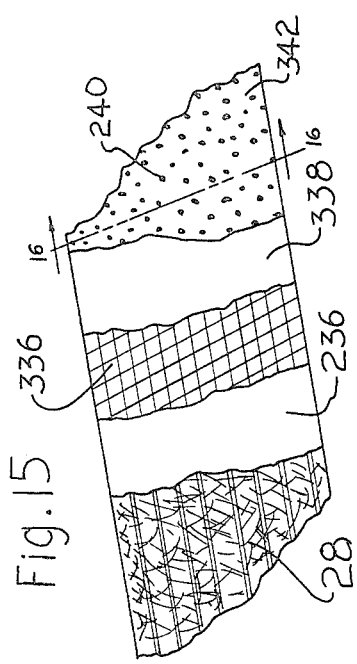
FIGURE 15 is an enlarged detailed view in perspective showing a section of a resinous sheet material comprising a glass fiber sheet base wherein the fibers are shown to be in a general jackstraw arrangement with parallel reinforcing, longitudinally of the sheet, and in another section the fibers are shown to be reinforced in both the transverse and longitudinal direction.
Figure 16:
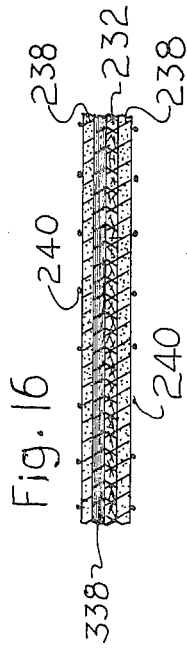
FIGURE 16 is an enlarged detailed view, partly in cross-section on the line 16 in FIGURE 15.

In accordance with this invention, a bituminous sheet material is made by applying a bituminous material, preferably asphalt, to the appropriate base, preferably a glass fiber sheet base. Preferably, the asphalt material is supplied in sufficient quantity to saturate the base and form a coating on its opposite faces.

It is within the scope of this invention to employ any synthetic mineral wool fibrous base bonded to a suitable non-thermal plastic binder. The full advantage of the invention is particularly realized with a glass fiber sheet material, such as glass fiber cloth, glass fiber mats and the like for the manufacture of pipe wrap, canal liners, shingles, roll roofing, roofing felts, waterproofing membranes and the like. Glass fiber mats are also preferred; especially is this so when the glass fiber mat is reinforced with an inorganic yarn. The reinforcing may be in either a transverse or a longitudinal direction but for some uses it is preferred that the reinforcing be distributed in both directions.

The preferred material for saturating the base consists of an oxidized asphalt in a molten state at a temperature sufficiently high so that the asphalt flows readily into the glass fiber sheet to saturate it. The preferred mat for use in making pipe wrap is a jackstraw arrangement of fibers reinforced with a continuous filament yarn and coated with a suitable binder to form a thin uniform mat, having a thickness of the order of fifteen thousandths of an inch, although both thicker and thinner mats may be employed. The reinforcing yarn preferably runs parallel with the length of the mat. This mat may also be used in making canal liner, roll roofing, shingles and the like but to obtain good tensile strength in two directions it is preferred to employ a mat with a random swirl arrangement of continuous filament with or without parallel reinforcement lengthwise of the glass fiber sheet and in some instances to employ heavier mats having thickness of 25 mils or even up to 50 mils and higher, particularly where better fire resistant properties are desired. Mats with the continuous filament yarn in a random swirl may also be used as a base sheet for the pipe wrapping material and in such case preferably include continuous parallel reinforcing yarns extending lengthwise of the sheet. The preferred asphalt has a ring and ball softening point above 100° F. and preferably above 225° F.

It has been found to be important in forming the improved bituminous sheet material with a synthetic mineral wool fiber sheet base, such as a glass or rockwool fiber sheet, to apply excess bituminous material, such as asphalt or asphaltic resins, to the sheet and then doctor off the excess at constant pressure. Where the bituminous sheet material is to be employed as a pipe wrap material, it is also preferable to employ a pair of rotatable rolls to doctor off the excess bituminous material and to permit both the rolls to rotate at peripheral speeds substantially the same as the lineal speed of the mat passing between the rolls.

In making asphalt sheet materials in accordance with the present invention suitable for use as canal liners or for roofing or other similar purposes, the glass fiber mat preferably is first saturated and coated with an asphalt material containing little or no filler, preferably a composition consisting of oxidized asphalt, as is preferred for pipe wrap, after which the excess asphalt is doctored off at a constant pressure sufficient to ensure that when the mat thereafter comes in contact with a second molten asphalt material, the saturant will not exude from the mat. After receiving this first or saturating application in this manner, the sheet is then coated to any desired thickness with a different asphalt material which may contain a filler or fillers. Again, it is preferred to apply an excess of the asphalt coating material and doctor off the excess. Preferably, the doctoring of the second coat is arranged to provide constant thickness in the doctored sheet instead of being done at constant pressure, the constant thickness being predetermined to give any desired product weight per square foot.

The bituminous material, such as asphalt, used to saturate and coat the base in the manufacture of any of the articles mentioned above, including pipe wrap as well as canal liner, roll roofing and the like preferably contains no filler but it is within the scope of the invention to include inert fillers such as diatomaceous type earth, asbestos, slate flour, mica and ground limestone, either individually or in various combinations of two or more of these filler materials, in such bituminous saturants. Generally, such fillers when employed in the saturant are added in relatively small quantities.

In the manufacture of any of the bituminous sheet materials above described, it is preferable to apply to both faces of the sheet after the application of the bituminous material is completed, a suitable non-sticking dusting material, such as mica, or talc, to reduce the tendency of the sheet to stick to surfaces with which it comes into contact. Following the dusting, the sheet is preferably cooled to harden the bituminous material in any desired manner, as for example, simply by permitting the sheet to cool in air or in any other desired way. The hardened sheet material is then ready for packaging and/or use after being slit, if desired, into narrower widths of material.

As indicated above, the drawings in FIGURES 1, 2, 3, 4 and 5 illustrate a preferred apparatus for forming bituminous sheet materials in accordance with the present invention. This apparatus designated generally 20 comprises a base or platform 22 carrying bearings 24 in which a roll 25 is mounted for rotation. The roll 25 supports a supply roll 26 of glass fiber mat material or other fibrous sheet material. This roll form is the preferred method of packaging glass fiber mat material, although it is within the scope of the invention to handle it in other forms if desired. Immediately to the left of the roll support 22 as shown in FIGURES 1, 2 and 4 is the portion of the apparatus in which the bituminous material is applied to the glass fiber mat which is designated 28. The bituminous material applying apparatus includes suitable supporting framework designated generally 30 supporting a pair of tanks 32 and 34 which may be jacketed if desired, to prevent heat loss. Each tank is provided with suitable heating means such as the heaters 36 and 38 shown in FIGURE 2. Mounted above the tank 32 for vertical sliding movement in guides 40 are a pair of vertically extending bearing support members 42. Each of the vertical bearing support members 42 is provided on its upper end with a rack 44 which engages a pinion 46. As seen in FIGURE 4, the two pinions 46 are mounted near the opposite ends of the shaft 48 which is rotatably supported on the upper portion of the framework. Pinions 46 are fixed to the shaft 48 and can be turned simultaneously by means of a handle 50 secured on the end of the shaft. Thus, by rotating the handle 50, the two bearing supports 42 can be raised or lowered simultaneously.

The bearing supports 42 carry on their lower ends pillow blocks 52 which rotatably support the shaft 54 of a drum 56 which serves as a dip roll. It is apparent that by raising or lowering the uprights 42 with the aid of the rack and pinion structure above described, the dip roll 56 can be lifted out of the tank 32 or submerged therein to any desired depth. Just above the dip roll 56 a U-shaped frame member 58 is pivotally supported at its opposite ends as at 60 on the same uprights 42 which carry the dip roll. The frame member 58 in turn rotatably supports a doctor roll 62 in opposed relation to the dip roll 56. As seen in FIGURE 2, a rope or cable 64 secured preferably to the central portion of the U-shaped frame member 58 as at 66 extends upwardly over guide pulleys 68 and 70 which may be mounted on the framework 30 but preferably are supported from the ceiling by means not shown. The free opposite end of the cable 64 is provided with means to receive removable weights 72. The weights 72 serve as a counterbalance against the weight of the roll 62 and by varying the weights 72 any desired pressure between the roll 62 and the roll 56 can be provided.

Preferably asphalt material is continuously supplied to the tank 32 to maintain a body of molten asphalt therein 74 up to the level indicated in FIGURE 2. The asphalt is preferably supplied from a source not shown through the float valve 76 which aids in maintaining the level constant and thereby assures that with the dip roll 56 in a given position, substantially a uniform coating of asphalt will be applied to the glass fiber sheet.

As best seen in FIGURE 2, a continuous strip of glass fiber sheet material 28 such as the glass fiber mat above described, is directed from the roll 26 down into the body of asphalt 74 in tank 32 underneath dip roll 56 and around the dip roll and between dip roll 56 and the doctor roll 62, thence up around the doctor roll 62 from which it is drawn off toward the left, over a non-rotatable guide roll 78 supported at its opposite ends, as at 80, in the depending frame members 82. It will be observed that the guide roll 78 is so positioned that the glass fiber sheet is drawn off the roll 62 in a plane substantially parallel with the plane through the axis of the doctor roll 62 and the axis upon which the frame member 58 pivots. This arrangement is preferred because it has the advantage that it eliminates any tendency for variations in the tension on the sheet 28 to cause the frame member 58 to pivot on the axis 60 and thus change the pressure between the roll 62 and the roll 56. The roll 78 is preferably provided with suitable heating means such as a steam jacket not shown, so as to maintain the surface of roll 78 at a sufficiently high temperature to prevent sticking of the treated sheet. The synthetic mineral wool fiber sheet threading arrangement described in this paragraph will hereinafter be called the "normal threading arrangement."

Referring now to the tank 34, it will be noted that above it also there are a pair of vertical racks or bearing supports 84 mounted in a pair of guides 86 to slide vertically. Each of the supports 84 is formed with a rack 88 on its upper end which engages a pinion 90, which pinions are secured near the opposite ends of a rotatable shaft 92 mounted in bearings 94 carried by the frame 30. Shaft 92 like the shaft 48 has a handle 96 secured on its projecting end which permits the two pinions 90 to be rotated simultaneously, thereby simultaneously raising or lowering the two bearing supports 84. The bearing supports 84 at their lower ends have bearings 98 secured thereon in which the opposite ends of a rotatable dip roll 100 are journaled. It might be added at this point that sometimes it is desirable to have the dip roll 100 stationary rather than rotatable.

Also above tank 34 adjacent the left hand side thereof as viewed in FIGURE 2, are a pair of fixed depending roll supports 102 carried by the frame 30. These supports 102 carry on their lower ends a pair of non-rotatable doctor rolls 104 and 106. Both doctor rolls are preferably heated by any suitable means since it has been found that doctor rolls heated to a temperature above the temperature of the asphalt in the tank 34 produce a better product. The upper roll 104 is adjustable with respect to the roll 106 in order to permit the thickness of the finished sheet to be varied. To this end, a vertically extending slot 108 is provided in each support 102 and the reduced and squared ends of the roll 104 extend into the slots 108. These ends rest on springs 110 compressed between the bottom portion of the slot 108 and the squared end of the roll 104. It is apparent that by turning the adjustable member 112, the roll 104 can be raised or lowered to provide any desired spacing between the rolls 104 and 106.

During the coating operation, a body of molten asphalt material 114 is maintained in the tank 34 preferably up to the level indicated in FIGURE 2. Additional asphalt material is supplied to the tank 34 from the supply tank 116 supported on the frame 30 above tank 34 as illustrated in FIGURE 2. Asphalt from the supply tank 116 is supplied to the tank 34 through the outlet 118 extending from the bottom of the tank 116 under control of the valve 120. As best seen in FIGURE 4, the tank 116 is centrally located over the glass fiber sheet 28 and intermediate the dip roll 100 and the doctor rolls 104 and 106 so that the asphalt from tank 116 is directed through the outlet 118 onto the upper surface of the glass fiber web extending from the dip roll 100 up to the doctor rolls 104 and 106. This assures that an excess of the asphalt coating material is provided on the top surface of the sheet.

FIGURE 2 illustrates in solid and dotted lines the two courses the glass fiber sheet can take with respect to the tank 34. In making pipe wrap which is given a single application of bituminous material in the tank 32, the glass fiber web is directed from the guide roll 78 as shown in solid lines in FIGURE 2 and between the doctor rolls 104 and 106 which are open sufficiently to provide ample clearance for the sheet or web passing through. It will be seen that for this operation, the dip roll 100 is elevated to the position shown in solid lines in FIGURE 2 which is well above the tank 34.

When the canal liner or roofing material or other asphalt sheet material treated with two different asphalt materials is to be made, the dip roll 100 is lowered to a position such as that indicated in dotted lines in FIGURE 2 and the web is directed into the body of asphalt below the dip roll 100 and thence up between the doctor rolls 104 and 106 as indicated in dotted lines. It will be apparent, of course, that the dip roll 100 may be lowered to any desired depth in the tank 34. As indicated above, the asphalt supplied to the tank 34 is directed onto the top surface of the sheet or web and in this manner, the sheet or web, when it arrives at the doctor rolls 104 and 106 has thereon an excess of the asphalt composition from the tank 34. The doctor roll 104 is positioned so as to give the desired sheet thickness, it being adjustable as explained above.

Whatever type of asphalt sheet material is being made, the sheet after passing the doctor rolls 104 and 106 is drawn past the roll 122 rotatably mounted on the bottom of dust box 124 suitably supported on frame 30. A supply of non-sticking dusting material such as mica or colored granules 126 is provided in the box 124 and as the roll 122 rotates, this material carried by the roll 122 through the slot 128 is sprinkled on the upper surface of the asphalt coated sheet 130 passing beneath the roll 122 but not in contact therewith. The dust box 124 may be of any desired form but preferably is V-shaped in vertical cross-section as illustrated and extends the full width of the sheet as does the roll 122 as illustrated in FIGURE 4. Roll 122, as is roll 144, is fluted and spaced a sufficient distance above the sheet 130 to avoid sticking of the roll and thereby provide proper distribution of the surfacing material upon the sheet. Also, these rolls, 122 and 144, are independently driven but their speed is synchronized with that of roll 132.

Referring now to FIGURE 1, it will be seen that to the left of the dusting box 124, there is a group of four large cooling drums 132, 134, 136 and 138. These drums are rotatably supported at their opposite ends on suitable framework 140 and are longer axially than the width of any glass fiber sheet to be processed. These cooling drums are preferably of the same size and synchronously driven by means of a variable speed means. Supported above and slightly to the left of the drum 132 on framework 140 is a second dusting box 142 provided with a rotatable roll 144 and otherwise generally similar in construction and operation to the box 124. This box also contains a body of dusting material such as mica or granules which is sprinkled on the sheet 130 as it passes beneath roll 144 and over the drum 132. Preferably, the four rolls 132, 134, 136 and 138 and the dusting boxes 124 and 142 are all enclosed in a suitable housing, such as 146, to confine the dusting material as much as possible.

The sheet 130, as shown, after being drawn past the dusting roll 122 is directed under the drum 132, then up around the inside of this cooling drum 132 between it and the roll 144 where a layer of dusting material is applied to the face of the sheet 130 opposite to that dusted by the roll 122, after which the sheet passes from the cooling drum 132 up and around the outside of the cooling drum 134, thence from the top of the drum 134 over to the top of the third cooling drum 136 around the outside of this cooling drum 136 down between the cooling drum 136 and the cooling drum 138 to the inside of the drum 138 and thence around this drum to the outside thereof and on upwardly as will be further described.

To further cool the sheet 130, this sheet after leaving the drum 138 enters a festooning arrangement designated generally 148. This festooning arrangement 148 comprises a series of upper rolls 150 and a cooperating series of lower rolls 152 staggered between the upper rolls 150.

As may be seen in FIGURE 1, this sheet 130 is directed over the upper and lower rolls 150 and 152 in the usual manner. From the last roll 152, the sheet 130 is directed to a pair of pull rolls 154 and 156, preferably after passing over a pair of guide rolls 158 and 160 supported on suitable framework.

Pull rolls 154 and 156 are likewise supported on this framework 162, roll 156 being supported on fixed bearings and roll 154 being adjustable. Thus, the bearings 164 for the roll 154 are slidable vertically in slots 166 formed in the bearing supports 163. Springs 170 extend in the slots 168 between the bearings 164 and clamping members 172 threaded through the upper portion of this support 168. As is apparent, the clamping members 172 may be turned down to compress the springs 170 to provide any desired amount of pressure between the rolls 154 and 156. The rolls 154 and 156 are driven by a suitable source of power 174 through a chain drive 176 which engages a sprocket 178 secured to roll 156, roll 154 being driven by a pair of cooperating gears 180 and 182 secured respectively to the rolls 156 and 154. Thus, by means of these driven rolls 154 and 156 tightly clamping the sheet 130, the sheet is pulled through the entire apparatus from the last cooling drum 138.

After the sheet has been pulled through the pull rolls 154 and 156 as illustrated in FIGURE 1, it passes under roll 156 and up and over to a pair of rolls 184 and 186, also rotatably supported on the framework 162. These rolls are also driven from the source of power 174 by suitable means such as the chain drive 188 engaging sprocket 190 fixed to roll 186. Roll 184 is in turn driven from roll 186 by cooperating gears 192 and 194 fixed respectively to rolls 186 and 184. The roll 186 like the roll 156 is provided with fixed bearings and the roll 184 like the roll 154 is adjustable to vary the pressure between rolls 184 and 186. To this end, the bearings of roll 184 are slidable vertically in slots 189 provided in the bearing supports 200. Springs 202 extending in these slots 198 are compressed between the bearings 196 and threaded clamping members 204 which are threaded through the tops of supports 200. Clamping members 204 are adjusted so that the rolls 184 and 186 exert a slight pull on sheet 130 but still permit some slippage, whereby the rolls 184 and 186 serve simply to feed the sheet 130 after it has passed the rolls 154 and 156 onto the endless belt 206 driven by suitable means, not shown, in the direction indicated by the arrows in FIGURE 1. The speed of the endless belt is predetermined to be sufficiently less than that of the sheet 130 so that as the sheet 130 is fed onto the belt 206, it is folded thereon into a series of large rough folds as indicated at 208. These large folds 208 provide a temporary storage for the finished sheet permitting intermittent reeling of the finished sheet as will be described.

From the endless belt 206, the sheet 130 is directed to a pair of braking rolls 210 and 212 rotatably supported on the framework 22. Preferably in passing from the belt 206 to the rolls 210 and 212, the sheet 130 is directed over a stationary guide roll 214 and around rotatable roll 216 which is supported on the framework 22. In many instances, it is desirable to slit the finished sheet 130 longitudinally and the braking rolls 210 and 212 and guide rolls 214 and 216 aid in providing a proper tension on the sheet 130 to facilitate the slitting operation. Suitable braking means are preferably provided in connection with the rolls 210 and 212 such as that illustrated in detail in FIGURES 3 and 5, including a leather strap 218 secured to the framework 22 at one end as illustrated at 220 and suspended over the roll 212 and provided with a suitable weight 222, whereby a drag is provided on the roll 212 to maintain any desired degree of tension on the sheet 130.

The sheet 130 may be slit in any desired number of widths. For purposes of illustration, the slitting of the sheet into two equal parts is shown. To this end, a slitting wheel 224 is rotatably supported on frame 22 in position to engage the sheet 130 just after it passes between rolls 210 and 212. Cooperating with the slitting wheel 224 is a roll 226 also rotatably supported on the framework 22 in position to press the sheet 130 against the slitting wheel 224 to ensure that it will be cut through properly. After passing the slitting wheel 224, the sheet is directed over a guide roll 228, also rotatably supported on the frame 22 and directed onto reel 230 on which it can be wound in any desired lengths. The reel 230 is driven in the usual manner by any desired means, not shown, and pulls the sheet from the belt 206 through slitting mechanism. When the desired length of the sheet has been wound on the reel 230, the sheet is cut laterally and the lengths are removed from the roll 230 after which the free ends of the sheet are secured to the reel 230 to wind new lengths thereon. The reel 230 is driven at a rate of speed higher than that at which the sheet 130 passes through the remainder of the apparatus and thus, will pull a number of the folds 208 from the belt 206 on which the sheet is stored to facilitate the slitting and reeling operation.

As indicated above, the glass fiber sheet material is preferably handled in roll form and a roll such as the roll 26 is shown in perspective in FIGURE 6 of the drawings. The portion of the sheet designated 28 is unrolled to better illustrate the appearance of the sheet prior to the application of asphalt material thereto.

FIGURES 7 and 8 show a section of finished pipe wrap 232 made with preferred filler consisting of the glass fiber mat material having a jackstraw arrangement of glass fibers reinforced with continuous filament yarn lengthwise of the sheet. As best seen in the large cross-sectional view of FIGURE 8, asphalt material is applied to the mat in sufficient quantity to impregnate the mat, filling in the the spaces between the fibers, and to provide a coating which completely imbeds the fibers of the mat and provides an asphalt surface on which mica dusting material is applied in sufficient quantity to minimize sticking.

FIGURES 9 and 10 illustrate a different type of sheet 234 in which two different asphalt materials have been applied to the glass fiber sheet base. As best seen in FIGURE 10, the one asphalt material is applied to the base in sufficient quantity to impregnate it and to provide an asphalt surface on both faces of the core 236. There is then applied a coating of a different asphalt material 238 which completely encases the core 236 in the second asphalt composition. This sheet also has non-sticking dusting material such as mica 240 applied thereto. Where the sheet 234 is to be used as a canal liner, mica is applied to both surfaces and where it is to be used as a roofing material, it is preferred to apply mica to one surface and colored granules to the other.

From the foregoing description of the preferred apparatus for forming asphalt sheet materials in accordance with this invention, it will be apparent that when a new roll 26 of glass fiber sheet material is placed on the machine, it is desirable to secure the free end of this roll to the last portion of the preceding roll so that the new sheet may be pulled through the machine; otherwise it will be necessary to waste a considerable portion of glass fiber sheet and re-thread the machine every time a new roll is substituted. Because the glass fiber sheet is subject to considerable tension as it is pulled through the machine, the joint between the old roll and the new roll of the glass fiber sheet material must be strong. It is also highly desirable that this joint be made in such a way that it does not mar the appearance of the section in which it is formed, making it necessary to cut out that section or discard it from the finished product.

The making of a joint to meet all the foregoing specifications proved to be very difficult. It has now been found, however, that a joint or splice such as that illustrated in FIGURE 11 does meet the specifications when it is properly formed. In making the splice illustrated, the two sections of glass fiber material 242 and 244 are lapped as illustrated, preferably for about one inch or more, the end of the new roll 242 being placed above the end of the old roll 244. A section of tape 246 is then placed over this lapped section. Tape 246 preferably extends across the full width of the glass fiber sheet and is preferably wide enough so that it covers the lapped portion and extends at least one inch on each side as indicated in FIGURE 11. The tape 246 carries on the face in contact with the glass fiber sheets a suitable adhesive material which is inert to the molten asphalt material which is to be coated on the glass fiber sheet, such as a remoistening type of glue or a thermosetting resin adhesive, the remoistening glue being preferred. For example, excellent results are obtained with a tape formed of heavy kraft paper, such as a 60-lb. kraft, coated on one surface with an adhesive composed of animal glue or animal glue containing a small amount of starch.

In making this splice with a tape coated with the preferred glue, the sections 242 and 244 are brought together as shown, a moistened section of tape 246 is then pressed down in the position illustrated in FIGURE 11. A strong bond is obtained quickly by heating the upper surface of the tape 246, preferably with a hot iron which is passed over the tape providing both heat and pressure to secure the various elements of the splice together permanently. While a remoistening glue is preferred, it has been found that a good splice can also be obtained with a tape having a thermosetting type of adhesive thereon, the bonding of which is preferably completed by the application of heat and pressure as described with the remoistening tape. Thus a successful bond has been obtained with paper tape such as that sold under the trademark "3-M" Industrial Tape which is a paper tape with a coating of a water activatable, heat hardening phenol-formaldehyde resin base adhesive.

By comparing FIGURE 11 with FIGURE 1, it will be clear that when the splice is formed as described, the face of the glass fiber sheet to which the tape is applied is the face which lies against the surface of dip roll 56. It has been found that when the splice is formed this way, adequate coating or saturation of the glass fiber sheet with asphalt material at the splice occurs and the splice is discernable only upon close inspection of the finished sheet and does not render the section of the finished sheet containing the splice unusable.

The operation of the above described apparatus is largely apparent from the foregoing description. In order to further illustrate the invention, however, the making of pipe wrap and also the making of a canal liner sheet in accordance with the preferred procedure will be described. In the making of pipe wrap, the glass fiber sheet from the supply roll 26 is directed into the tank 32 passing under the dip roll 56, then around between the dip roll 56 and the doctor roll 62. A body of molten asphalt material is maintained in the tank 32 being supplied thereto continuously through the float valve 76.

A number of characteristics of a desirable glass fiber sheet have been described above. The sheet that is particularly preferred is a mat with a jackstraw arrangement of fibers reinforced with a continuous filament yarn and coated with a suitable binder, preferably a thermoset resinous material to which asphalt readily adheres. Such a binder is provided by applying to the glass fiber an aqueous dispersion of an "A" stage, thermosetting phenol-formaldehyde resin containing a small amount of gelatin together with a small amount of soluble oil. The dispersion is applied in sufficient quantity to deposit the binder on the mat in an amount equal to about 10% to 30% of the weight of the glass fiber mat, the preferred range being 14% to 24%, and the mat is then heated to an elevated temperature to evaporate the water and convert the resin to the infusible, insoluble stage. Other suitable binder compositions and methods of applying the same are disclosed in the U.S. Letters Patent No. 2,523,-759, granted to John A. Grant on September 26, 1950;

No. 2,083,132, granted to Robert C. Williams et al. on June 8, 1937; No. 2,566,960, granted to T. E. Phillips on September 4, 1951; and No. 2,550,465, granted to F. T. Gorski on April 24, 1951. The present invention, however, makes it unnecessary to include bituminous material in the binder as taught in the patent to Grant No. 2,523,759.

The reinforcing yarn runs parallel with the length and is placed on approximately ⅜ inch centers. The product has the appearance of a thin, smooth uniformly bonded mat having an average or approximate thickness of about 15 thousandths of an inch. Mats of this type are available in widths of 18 inches and 36 inches and are commonly packaged in rolls containing from 1,000 to 2,400 feet. In the making of pipe wrap the porosity of the mat itself is of importance and it is preferable that the mat described having a thickness of approximately .015 inch shall have a porosity of not exceeding about .080 inch of water at 200 feet per minute. It is also preferable that the mat have an ignition loss of approximately 16% with a tolerance of from minus 2% to plus 4%. Preferably the weight per square foot for the same mat is approximately .0095 pound with a tolerance of plus or minus 10%, i.e., having a weight per square foot of about 0.00855–0.01045 pound. The textile yarn content in the continuous filament reinforcement is preferably from 75 to 450 filaments and the fibers in the jackstraw arrangement preferably having a diameter of about 0.00065" with a tolerance ranging from a minimum of 0.0006 to a maximum of 0.0007 inch. Such a sheet has been found to form an excellent core or base for a pipe wrap material and similarly is highly desirable as a base for canal liner or roofing material.

In the manufacture of pipe wrap, the asphalt material applied to the glass fiber sheet in the tank 32 preferably consists entirely of oxidized asphalt, although it may contain up to 10% of a standard pipeline enamel. Other bituminous materials such as a modified or plasticized coal tar pitch of the steep-roofing type may also be used, either alone or in a blend with asphalt. For some usages the dark color of bituminous coated synthetic mineral wool fiber sheets or mats is objectional. Therefore, where dark color is objectional or for other reasons the lighter colored resinous materials such as the suitable olefin polymers of the requisite melting range may be used instead of asphalt. The nature of these olefin polymers are well known and used in the arts under the generic names of polyethylene, polypropylene, polybutylene, polystyrene, polyvinyl plastics, etc. One oxidized asphalt which has been found to give particularly good results from the standpoint of suitable hardness and pliability has approximately the following physical characterstics:

Ring and ball softening point _____ 250° F. plus or minus 10° F.
Penetration at 32° F. (200/60) ____ 10 minimum.
Penetration at 77° F. (100/5) ____ 16 minimum.
Penetration at 115° F. (50/5) ____ 25 minimum.
Ductility at 77° F. _____ 1.5 cm. minimum.
Flash point (Cleveland open cup) _ 450° F. minimum.
Fire point (Cleveland open cup) ___ 500° F. minimum.
Solubility in carbon tetrachloride __ 99.5% minimum.

This particular asphalt is preferred for saturating the preferred glass fiber mat described above to make a pipe wrap suitable for standard pipeline operation when the wrap is applied with conventional pipeline enamel applied to unheated pipe. Other asphalts may be used within the scope of the invention as indicated above, however, and for application under other conditions, asphalts having different characteristics which can be readily selected by those skilled in the art will be preferred.

It has been mentioned above that the asphalt applied in the tank 32, while preferably consisting entirely of oxidized asphalt, may contain up to approximately 10% or slightly more of a standard pipeline enamel, such as the coal tar enamel sold under the trademark "Koppers" 70–B Pipe Line Enamel. This coal tar is included in the saturant chiefly to meet the demands of the trade which requires a saturant containing at least some tar. Generally, this requirement is met by a saturant consisting of 99 parts by weight of oxidized asphalt with one part by weight of the standard pipeline enamel. Preferably, the pipeline enamel should have a softening point in excess of 200° F. when employed with the above described preferred asphalt in order to minimize the effect of the tar on the physical properties of the product. The preferred "Koppers" 70–B Pipe Line Enamel has a ring and ball softening point of 239° F., a penetration at 32° F. (200/60) of 1 and a penetration at 77° F. (100/5) of 2. Thus, it approaches closely to the characteristics of the preferred oxidized asphalt.

It has been indicated above that the asphalt is applied to the glass fiber mat in a molten condition. It has been found preferable to maintain the asphalt saturant in tank 32 when employing the above described preferred oxidized asphalt with or without up to 10% of the preferred pipeline enamel at a temperature of about 420° F. plus or minus 5° F., although other temperatures may be employed for this particular saturant. It may also be preferable to maintain the asphalt in the tank 32 at a different temperature where the saturating point is materially greater or less than that of the preferred asphalt described above. This illustrative example, however, will enable those skilled in the art to select a suitable temperature for the asphalt in the tank 32, once the principal characteristics of that asphalt are known.

To obtain the best results, it is necessary to consider in connection with the temperature of the saturating tank 32, the softening point of the saturant and the pressure exerted by the doctor roll or rider roll 62. The practical way to determine or control the amount of pressure to be exerted by the roll 62 is to measure the weight of the finished product and then increase or decrease the weight 72 on the counterbalance so as to provide the proper pressure for the desired finished product weight. Using the preferred asphalt above described on the preferred mat, the desired product weight for the pipe wrap is 12 pounds plus or minus 2 pounds per 100 square feet or better yet from about 11.4 lbs. to about 12.5 lbs. per 100 square feet. This provides a sheet having a thickness of approximately 0.035 inch. Using the above described preferred mat, asphalt and procedure it has been found that the porosity of the pipe wrap obtained varies in general directly with the weight of the product. A change in the mat, asphalt or procedure will, however, change the porosity so that even at the same product weight the porosity will be different. A porosity such as is possessed by the above described preferred product weighing from about 10 lbs. to about 14 lbs. per 100 square feet has been found to be satisfactory for the pipe wrap.

Porosity may be measured in various ways. A measure well suited to the present invention is air permeability of the sheet or pipe wrap. Values given are the average of determinations made on 10 specimens 12 inches by 12 inches and are actual cubic feet of air per minute which pass through the specimen at 2 inches water gauge resistance. The product weights are the average of the actual weights of the specimens. For convenience a permeability index which is equal to the log 10 of 1000 times the air permeability is also given. The values obtained as described above are as follows:

| Product Weight, lbs. | Permeability, c.f.m. air/sq. ft. | Index |
|---|---|---|
| 14 | 0.07 | 1.84 |
| 12 | 0.95 | 2.98 |
| 10 | 13.00 | 4.11 |

For best results in wrapping pipe a permeability of from 0.5 c.f.m. air/sq. ft. to about 2.0 c.f.m. air/sq. ft. is preferred giving a particularly preferred product weight range as shown in the following table:

| Product Weight, lbs. | Permeability, c.f.m. air/sq. ft. | Index |
|---|---|---|
| 12.5 | 0.5 | 2.70 |
| 12.0 | 0.95 | 2.98 |
| 11.4 | 2.0 | 3.30 |

Nevertheless, pipe wrapping materials having porosity indexes from as low as about 1.8 to as high as about 4.2 have been found usable, since they permit the escape of gases trapped in the wrapping operation but retain the hot fluid pipeline enamel when applied thereover.

In the manufacture of pipe wrap particularly, as suggested above, two factors have been found to be important in connection with the doctoring off of the excess saturant applied in tank 32. In the first place, constant pressure between the roll 62 and roll 56 is important to form the best product and to this end, it is important that the sheet passing from the roll 62 to the roll 78 extend in a plane approximately parallel to a plane through the axis of the roll 62 and the axis upon which the frame 58 is pivoted. This minimizes any tendency for a variation in tension to cause the pressure between the roll 62 and roll 56 to vary. It will be apparent that if the guide roll 78, for example, is so positioned that the plane of the glass fiber sheet leaving the roll 62 extends upwardly at an angle with respect to arm 58, an increase in the tension will tend to lift the roll 62, thus decreasing the pressure between it and roll 56 and a decrease in the tension will have the opposite effect.

A second factor which is of importance is the speed of the rolls 56 and 62. In the apparatus illustrated, these are made freely rotatable and the asphalt sheet is carried around them in such a way as to ensure that the peripheral speed of the two rolls will be substantially the lengthwise speed of the glass fiber sheet at all times. It has been found that this aids materially in providing the desired porosity in the pipe wrap which is described above, that is, a porosity such that it permits gases trapped in the wrapping operation to escape but still retains the pipeline enamel.

The maintenance of a substantially constant hydrostatic head in the tank 32 with the aid of float valve 76 also contributes to uniformity in the product. In accordance with the preferred method of operation, only the oxidized asphalt is supplied through the float valve 76 and when tar or pipeline enamel is to be included in the saturant, this tar is metered directly into the tank 32 in proportion to the lineal speed of the glass fiber sheet and is mixed in the tank with the oxidized asphalt.

Changing the speed at which the glass fiber sheet 28 passes through the tank 32 without changing any other condition, affects the amount of asphalt applied to the sheet. Thus, increasing the speed, increases the quantity of asphalt applied because the time for heating the sheet is shorter and the hydrostatic pressure of the asphalt on the roll 62 tends to lift it slightly. This latter effect can, of course, be compensated as desired by changing the weights 72.

As explained above, the glass fiber sheet saturated in the tank 32, after it is passed between the dip roll 56 and the doctor roll 62, is directed over the guide roll 78 and past the tank 34 to the first dusting box 124 which preferably contains a quantity of finely divided mica which is continuously dusted on the top surface of the sheet by the roll 122. The asphalt coated sheet passes around the cooling drums as previously described being coated on the other side with mica by the roll 144, then through the festooning arrangement 148 between the pull rolls 154 and 156 and the feed rolls 184 and 186 which feed the sheet onto the endless conveyor 206. In this conveyor, the sheet is taken off as described above and wound on the reel 230 in any desired length being slit into any widths desired as above described.

In the making of a sheet coated with two different asphalt compositions such as canal liner, roofing material and the like, the coating of the glass fiber sheet in tank 32 is conducted essentially as in the making of pipe wrap. However, for best results, the porosity index of the saturated sheet after treatment in tank 32 should be greater than about 4.2, whereby the second coating of bituminous material applied in tank 34 keys through the pores base and bonds thereto. The same oxidized asphalt is preferred as the saturant in this tank, although preferably the pressure exerted by the roll 62 is controlled to be just great enough to ensure that none of the asphalt material applied in tank 32 exudes from the glass fiber sheet when it is dipped in the asphalt composition in the tank 34. Asphalt compositions applied in tank 34 contain filler material as will be described and it has been found that much better adhesion of the filled asphalt material to the glass fiber sheet is obtained when the sheet is first coated with the composition consisting of oxidized asphalt or oxidized asphalt mixed with tar in tank 32. It is to be understood, however, that although the saturant applied in tank 32 preferably consists of oxidized asphalt with or without tar, other bituminous materials may be employed in this tank in the manufacture of the canal liner and roofing material as well as in the making of pipe wrap. For example, a flux may have its softening point, penetration and ductility properties adjusted to the desired range by the addition of petroleum resins, asphaltenes or resinous polymer such as polybutylene to give a saturant having special properties such as hardness or adhesion, etc.

A body of filled asphalt composition is maintained in the tank 34 preferably to a predetermined level and as indicated above, the dip roll 100 is lowered into this tank to a suitable depth such as that indicated in FIGURE 2 to cause the sheet to receive the coating of the asphalt material in tank 34. It has been found that the dipping of the sheet causes an excess of the coating material to be carried up out of the tank on the underside of the sheet but it has been found to be preferable to supply the coating composition to the tank 34 by directing it onto the top surface of the sheet after the sheet has been lifted out of the asphalt in the tank 34 in order to assure that the top surface of the sheet will also have an excess of the coating material thereon. One method of doing this is described above in connection with FIGURE 2. The supply of the coating composition onto the top surface of the sheet is controlled by the valve 120 in the apparatus illustrated to provide an excess on the sheet and also cause a portion to flow from the sheet into the tank 34 thereby maintaining the coating material in tank 34 at the desired level. The sheet with the excess of the asphalt composition thereon is then pulled between heated stationary doctor rolls 104 and 106 which have previously been set to desired spacing to give the sheet the desired finished product weight. It has been found that best results are obtained if the doctor rolls 104 and 106 are maintained at a temperature somewhat in excess of the temperature of the coating composition in the tank 34, range from approximately 320° F. to about 450° F. for the compositions hereinafter described which are preferred in manufacturing canal liner or roofing material. As indicated above, the spacing of the doctor rolls, like the constant pressure on roll 62, is preferably controlled by weighing the finished product and adjusting the spacing of rolls 104 and 106 to provide the desired weight.

After passing through the doctor rolls 104 and 106 the course of the canal liner or roofing material or other sheet coated with two different asphalt compositions is the same as that described above for the pipe wrap and need not be repeated.

In the description of FIGURES 3 and 5 above, mention is made of the braking of the sheet by the rolls 210 and 212. It has been found that this braking to provide tension is particularly important when the sheet is being slit. It is also important that the braking action be uniform across the entire width of the sheet so as to apply a uniform tension all across the sheet.

Reference has been made above to the preferred compositions to be applied as the second coat of asphalt material in tank 34 in the manufacture of canal liner and roofing material. All the preferred compositions contain between about 60% and about 70% of asphalt by weight. The preferred asphalt is an oxidized asphalt made by combining a heavy vacuum gas oil with a straight run residuum either prior to oxidation or subsequent to oxidation followed by a further oxidation of the mix. This mixed asphalt has a very desirable penetration softening point relationship. Thus, this preferred asphalt has a softening point of approximately 190° F. to 200° F. ring and ball with a penetration at 77° F. (100/5) above 25. This particular asphalt has been found to have many desirable physical properties in a canal liner, although other asphalts may be used in accordance with this invention. A particularly desirable physical property of this preferred asphalt is a greater degree of pliability at outdoor temperatures approaching zero, which conditions are frequently encountered during the season when canal liner can be applied. Although fillers aid in obtaining desirable physical characteristics, it appears that the type and softness or hardness of the asphalt employed is probably more important in obtaining the desirable properties than the fillers. Compositions which have been found to give highly satisfactory asphalt sheet materials when applied in tank 34 as above described are as follows:

| Constituent | Weight Percent | | |
|---|---|---|---|
| | 1 | 2 | 3 |
| Asphalt (preferred oxidized asphalt described above) | 62.00 | 62.00 | 68.40 |
| Dicalite (for asphalt) | | 7.22 | 2.90 |
| 325-Mesh Slate Flour | | 9.65 | 3.94 |
| 160 Grade Mica | 5.00 | | |
| 7-R Asbestos | 15.00 | 10.80 | 11.83 |
| Ground Limestone (8-Mesh)° | 18.00 | 10.33 | 12.93 |
| | 100 | 100 | 100 |
| Specific Gravity Mix | 1.32 | 1.31 | 1.25 |

The specific gravity of the various coating compositions is given since this is of some importance at least in connection with canal liners. A canal liner material is preferably substantially heavier than water so that it does not float if placed in water. Thus, it is preferred that the coating composition to be applied in forming canal liner should have a specific gravity greater than 1.00 and preferably as great as is characteristic of the foregoing mixes.

The ingredients or constituents of the foregoing coating compositions may be mixed in the portions specified in any desired manner. It is preferable, however, that the mixing be thorough in order to ensure uniform distribution of the fillers throughout the asphalt. It will be further understood, of course, that these particular formulations are merely illustrative and that both larger and smaller quantities of the same or other constituents may be employed in accordance with the present invention to form filled asphalt compositions suitable as outer coatings on glass fiber sheet filled materials.

Of the foregoing compositions, that numbered 1 is preferred in the manufacture of shingles or roll roofing material particularly fire resistant shingles or roofing. This mix, when employed with a glass fiber mat of the preferred types described above to make shingles of any of the standard sizes and types, or roll roofing, could be expected to qualify for Class B Underwriters Laboratories' Label Service for designs providing essentially single-coverage roofings, and for Class A Underwriters Laboratories' Label Service for designs providing full double-coverage roofings. On the other hand, composition No. 3 is preferred for use in the making of canal lining material because of its superior handling properties not only in manufacturing but also in applying.

Of the constituents included in the above three illustrative formulations of filled asphalt coating compositions, the asphalt has already been discussed above. The next constituent, "Dicalite" for asphalt designates a poorly controlled, inexpensive grade of diatomaceous earth type filler. The designation "7-R Asbestos" is an official designation of the Canadian Standard Association, indicating a particular classification of asbestos fibers. "160 Grade Mica" is a standard grade of commercially available roofing mica which is commonly used on certain smooth roll roofings and shingles. The names of the other constituents are self-explanatory.

The purpose in employing a diatomaceous earth type material such as "Dicalite" in the above formulations is to provide for micro-stabilization of the composition with respect to softening point without appreciably decreasing the penetration of the material. By way of explanation, it may be interpreted, for practical purposes, as the temperature at which the material in question reaches a certain viscosity range (this viscosity range being approximately 12,000 to 20,000 centipoises). The penetration of the material, for practical purposes, can be regarded as a measure of the hardness or softness of the material at room or ordinary temperature, although the penetration will vary markedly depending on the wetting characteristics of the material for the needle. However, for any given type of asphalt, or asphalt-filler combination, where the wetting qualities are presumably about equal, the degree of penetration is a fairly good measure of the consistency of the material, a greater penetration indicating a softer compound and vice versa.

The 325-mesh slate flour serves as an intermediate micro-stabilizing filler. It also has the properties of promoting a smoother mix and producing a more stable mix from the standpoint of thixotropic changes upon aging. The 325-mesh slate flour as a filler has also been found to provide marked improvement in the weathering qualities of the composition. The 160 grade mica is added primarily for its excellent effect on the weathering qualities of the asphalt composition.

"7-R Asbestos" is employed to provide macrostabilization of the entire composition and tends to change the mix from a viscous or quasi-viscous material to a pseudoplastic or plastic mix so that the mix will not flow unless subjected to stress beyond a certain critical value designated as the yield value of the mix. (The foregoing terms are used in their strict rheological meanings.) It is the foregoing characteristic provided by the asbestos, which is primarily responsible for the excellent fire resistant quality of composition No. 3.

The limestone is added primarily as a weighting filler to increase the specific gravity of the composition. It is comparatively ineffective as a stabilizing filler and so has only a relatively minor effect on the consistency of the finished product. In the foregoing, the term "stabilization" is used in the sense of decreasing the flow qualities of the asphalt or other fluid to which a filler or fillers may be added.

Asphalt sheet materials comprising a glass fiber mat base, a bonding coat of asphalt material on said base, and a layer of different filler asphalt composition secured to the mat by the bonding coat have been made in a wide variety of weights ranging from 50 to 140 pounds per 108 square feet. By way of illustration, the canel lining material coated with the composition No. 3 above, with a weight of about 75 pounds per 108 square feet has been found to give very good service. Linings weighing more than 75 pounds per 108 square feet do give somewhat better service but, for many uses, the added cost of the heavier lining outweighs the service improvement except where difficult service conditions are encountered. Similarly, sheet materials weighing less than 75 pounds per 108 square feet may be used and will give satisfactory service where the requirements are not too great.

From my disclosure on the preceding pages it is readily apparent that a bituminous saturated synthetic mineral wool fiber sheet or mat having appreciable porosity is very desirable in the preparation of bituminous or resinous coated products, since the pores in the sheet or mat are filled with the coating material to key or tie together the coating material on opposite sides of said sheet. Hence, it is also apparent that a material keyed or tied through the pores of the fiberous sheet or mat offer greater resistance to their separation than where the bond is essentially due to interfacial contact between the coating and the saturated sheet.

Accordingly, the porous saturated synthetic mineral wool materials of this invention are particularly adaptable for use in preparing laminated products or systems. For instance, the laminated product of FIGURE 21 may have both sides waterproofed but yet have at least one side vapor proofed or have the outer side vapor impermeable. Hence, better bonded laminated products could be prepared having improved use characteristics in sound proofing and in insulation as well as having the unique property of armor plating, i.e. a product having an outside layer very resistant to crushing or abrasion, or affording great strength in certain directions. A rock shield is an excellent example of where a superior product in needed having an armored outer layer. This product may be readily obtained by lamination of the requisite mineral wool sheets or mats.

Another article wherein it is desirable to have a synthetic mineral wool fiber sheet or mat laminated to another sheet or mineral is in the glass fiber roofing base felts which are to be mopped with hot asphalt.

In FIGURES 1, 2, 13 and 14, two embodiments of the lamination equipment usable in this invention are shown. These two embodiments for convenience hereinafter will be designated as the "straight through" and the "normal sheet threading arrangements." The straight through threading arrangement is shown in FIGURE 13 together with a braking mechanism which is preferred with either threading arrangement. Said braking mechanism comprises an inclined plank or board having its lower end resting against an adjustable flange forming part of the upward extension of the supply roll 26 support frame and also having the upper part thereof resting on the supply roll 26 together with a means 303 for attaching weights to the board to adjust and control the braking tension applied to the sheet.

In the straight through threading embodiment as shown in FIGURE 13, the sheet passes across the saturation zone in substantially a horizontal plane and makes substantially a tangential contact with the top of the dip roll 56 and the constant pressure rider roll 62, i.e., a nip contact. In this embodiment the sheet from supply roll 26 passes under roll 302 instead of over its top as in the normal threading arrangement. Also in the straight through threading arrangement, roll 302 is lowered on the support bracket 302 until the lower side thereof is level with or slightly lower than the top of the dip roll 56 at the point where the sheet contacts said dip roll. Also, it is necessary to move the constant pressure roll 62 inward in the slot of the frame member 58 toward the pivot axis, until its center is on the extension of the line formed by the center of the dip roll 56 and the point of contact of the sheet with the dip roll. The weights 72 are adjusted to cause the desired pressure to be exerted on the sheet by roll 62, or in some cases it may be necessary to add weights to the frame member 58 to increase the pressure theron.

By adjusting the scraper means 316–317, the amount of saturant carried by the dip roll 56 from the tank 32 to the nip is controlled. From the dip roll 56 the sheet passes over roll 78 which has been lowered on the support 82 to position its top in substantially the same plane as that of the sheet when it passes from roll 302 to the dip roll 56. From roll 78 onward the threading and treatment of the synthetic mineral wool saturated sheet may be of the same type as the treatment given when using the normal threading arrangement.

The sheet or mat passing through the saturator in the straight through manner is preferably laminated by passing a sheet or mat from the supply source 320 (not shown) upward over the rotatable idle carrier rolls 313 and under dip roll 56 which is immersed in the saturant to the desired depth. The sheet from 320 passes upward and around dip roll 56 to contact sheet 28 as it passes under the doctor roll 62 which also acts as a lamination roll. The laminated sheet from the doctor roll 62 passes over the top of roll 78 (said roll having been lowered to permit its top to be in the horizontal plane passing through the nip formed by the rolls 56 and 62) and to coating drum 132 and then through the rest of the system in the usual manner.

It should be specifically noted that the direction of rotation of dip roll 56 has to be reversed to successfully use the straight through threading arrangement; it is rotated counter-clockwise as shown by the arrow on the dip roll 56 in FIGURE 13.

The normal threading embodiment of this apparatus which is shown in FIGURES 1 and 2 is also capable of being utilized to prepare lamination product. For instance, the synthetic mineral wool sheet 28 passes from the supply roll 26 through the saturation and coating apparatus in the normal threading arrangement and on through the cooling and festooning system etc. in the manner shown in FIGURE 1. As the saturated and coated sheet goes around cooling drum 132, it is met with a suitable prepared sheet or mat from supply source 309. This sheet or mat from supply source 309 travels around cooling drum 132 in contact with the saturated and coating sheet 28 in the manner shown in FIGURE 14. The two sheets are laminated together as they pass between the lamination roll 321 and the cooling drum 132. From the lamination roll 321, the integrated and laminated sheets travel upward and around cooling drum 134 and on through the equipment in the aforesaid manner.

Figure 18:
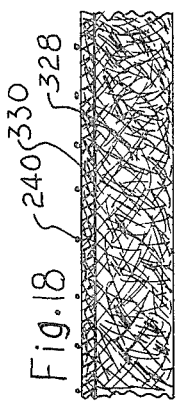
FIGURE 18 is a view of the mat of FIGURE 17 which has been skin saturated on one side.
Figure 19:
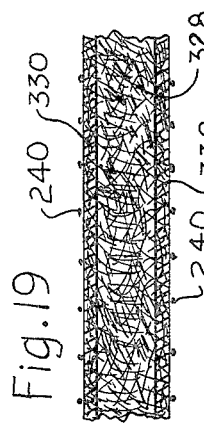
FIGURE 19 is a view of the mat of FIGURE 17 which has been skin saturated on both sides.

It has been found to be a preferred practice to give the synthetic mineral wool sheets or mats a saturation treatment prior to the lamination step because this treatment enhances the bond achieved upon lamination. This saturation may be either throughout the sheet (FIGURE 20) or only skin deep (FIGURES 18 and 19). If the saturation is only of the skin type as illustrated by the numbers 330 and 332, then the straight through threading arrangement is preferred for achieving said skin saturation. Although the skin saturated sheet obtained by the straight through threading arrangement has some porosity, it is generally considered to be advisable to pass the skin saturated sheet or mat over a bake or heating means to cause the saturant to migrate inward and thus increase both the permeability of the sheet and the depth of saturation. Hence, it is possible to skin saturate a thick, ultrafine, bonded glass fiber insulation mat (for example, those available commercially and described in the art under the trade names Aerocor or Ultralite) having a thickness of at least ⅜" on both sides to obtain a product like the one shown in FIGURE 19 which has enhanced insulating value and resistance to tear or handling damage. Further, it is also apparent that by means of the proper heat treatment to affect the permeability of the skin saturated area, the product of FIGURE 19 may be rendered waterproof and vaporproof on one side but waterproof and vapor permeable on the other to give a more desirable insulation material from the standpoint of moisture condensation inside the insulation.

In general, it is not necessary to limit the sheet or mat material being laminated to the resinous treated glass fiber mats or sheets to the synthetic mineral wool sheets or mats. For example, materials such as cloth, asbestos, metal foils (for instance aluminum), paper (kraft) etc. may be used in place of glass to give a laminated product. Such a laminated product comprising a saturated bonded glass fiber sheet laminated to a heavy duty bituminous coated kraft paper is shown in FIGURE 22. The material of FIGURE 22 is a novel laminated product which makes possible the construction of a built-up roof using the glass sheets described herein without first laying a drip barrier such as the usual bituminous saturated felts or sheathing papers in a separate operation. A product of this type is made by laminating a saturated bonded glass fiber sheet such as the one of FIGURE 7 with a suitable non-mineral wool sheet material, for example, kraft paper, cloth sheet, metallic foils, etc. The lamination is normally achieved by feeding the bonded glass fiber sheet from supply source 320 around the dip roll 56 in the manner shown in FIGURE 13. Also, the kraft paper is fed through the system in the straight through threading arrangement from supply roll 26; consequently, the bonded glass fiber sheet is saturated throughout (as shown in FIGURE 20) prior to its contacting in laminating relationship the kraft paper sheet from supply roll 26.

Figure 17:
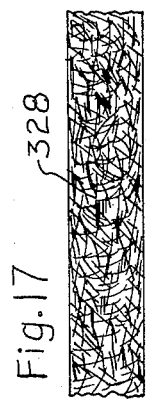
FIGURE 17 is a view in perspective of a section of thick ultra fine bonded glass fiber insulation mat.

When it is desired to produce an armored product, the thick, ultra-fine, bonded glass mat of FIGURE 17 (sometimes called glass fiber insulation mat) having a jackstraw arrangement of its fibers, is saturated to obtain skin saturation on one or both sides or saturated throughout as indicated in the respective figures numbered 18, 19 and 20. The saturated mat is then laminated to a sheet of canal-liner, or similar waterproofing membrane, to obtain the sheet of FIGURE 21; said laminate is unusually well suited for protecting the coating and wrappings on buried pipelines from damage during backfilling or from hard objects present in the bottom of the trench and the backfill.

Figure 20:
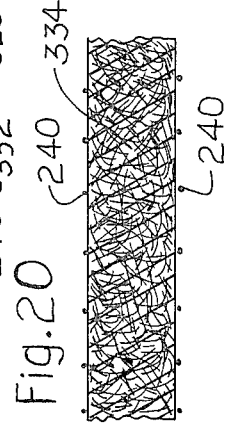
FIGURE 20 is a view of the mat shield of FIGURE 17 which has been saturated internally as well as externally.

For less severe conditions, the articles illustrated in FIGURES 18, 19 and 20 may be acceptable rock shield materials without the armor plating.

Mats thicker than those of FIGURES 17, 18, 19 and 20, i.e., about 3/8 inch to 1½ inches are not readily processed in the equipment shown in FIGURE 1 since some of the rolls require rather sharp turns which result in breaking of the sheet. Therefore, when handling mats thicker than about 1½ inches the size of the rolls will need to be increased accordingly. Also, sheet material such as that shown in FIGURES 7, 8, 9, 10 and 16, having a thickness of 0.014 inch to 0.080 inch is preferred for the normal threading embodiment as thicker sheets have a tendency to break from weight of asphalt picked up in the saturation tank.

Although the pipe wrapping material in accordance with the present invention which has the most desirable characteristics includes a synthetic mineral wool sheet base, such as a glass fiber sheet base, certain advantages of the invention may be attained with other sheet bases impregnated with asphalt. Thus the advantage of high tensile sheet lengthwise with a reduction in the number of breaks during wrapping is attained by including in any type of sheet base a plurality of continuous synthetic mineral wool, such as glass fiber, yarns which extend generally parallel to each other lengthwise of the sheet. Preferably, a sufficient number of the continuous yarns as above described is employed so that they are spaced apart not more than 3/8" from one longitudinal edge of the wrapping material to the other although the spacing may be somewhat greater than 3/8" if desired and various sizes of yarn may be employed to obtain the desired increase in tensile strength.

It is also within the scope of the invention to provide pipe wrapping materials comprising a bonded synthetic mineral wool sheet base material impregnated with asphalt and having a porosity such that, when it is wrapped on pipe over a coating of hot fluid pipeline enamel, it permits gas trapped in the wrapping operation to escape but retains the enamel. As is disclosed above, this is characteristic of pipe wrapping material having a porosity index, as described above, of from about 1.8 to about 4.2. The porosity may be provided in any desired manner. One method of providing pipe wrapping material with such porosity is described above but others will be readily apparent to those skilled in the art.

Many of the advantages of the present invention will be apparent from the foregoing description. A greatly improved pipe wrap material is provided which has all the desirable characteristics of the felt base wraps heretofore used and, in addition, has a number of unique properties. More particularly, the pipe wrap is unique in that it does not lose strength when exposed to temperatures of 500° F. for as much as three minutes and, in addition, it is unaffected by pipeline enamel application temperatures within a range of 350° F. to 500° F. When pipe is wrapped with this new pipe wrap, a great increase in the break impact strength of the enamel coating is noted which enables the coating to better withstand handling shock and strain stressed during back filling operations. The wrap has a high tensile strength which is great enough to resist practically all strains encountered in application which is also a unique characteristic. It also provides a much better dielectric pipe wrap so that jeeps are practically eliminated. Another outstanding characteristic of the pipe wrap is the controlled porosity which permits full release of the trapped gases while retaining the enamel. An important result of these improved characteristics is that pipe can be wrapped with the outer wrap of this invention at a rate as much as one-third greater than the rate at which it is possible to wrap pipe with the outer wraps heretofore known.

The invention also provides a novel and improved canal liner material, which is the first prefabricated membrane type of canal liner which has proved successful in use. A superior roofing material is provided which has excellent fire resistant qualities. An outstanding advantage of the roofing material, particularly the shingles which can be made in any of the standard sizes and forms, is that shingles in accordance with the invention can be made in a conventional Class C weight which qualify for Class A or Class B protection resulting in an important saving in freight charges. The asphalt coated glass fiber sheet materials also have many other uses.

In the manufacture of roofing materials, including both roll roofing and shingles and particularly fire resistant roofing, the control of blistering is a serious problem. An outstanding advantage of the present invention is that it provides an excellent control of this problem in several respects. One of the important causes of blistering is the blistering which is produced by voids which are left in the sheet due to incomplete saturation of the sheet filler. In accordance with the present invention, the voids remaining in the glass fiber mat base are reduced practically to zero, thus eliminating this cause of blistering. The coating composition applied to the saturated base is also another source of blistering. In the present invention, the saturating from this source is controlled by the use of a mastic coating, particularly that specifically stated above as preferred for roofing. This composition is especially effective in eliminating blistering in fire resistant roofing materials. It also has the advantage that it does not deform at temperatures of 150° F. to 160° F. which are considered critical in roofing materials. Another source of blisters is incompatibility between the saturant applied to the base and the coating applied over the saturant or bonding coat. By employing a substantial grade of asphalt as the saturant or the same asphalt, both in the saturant and in the coating, incompatibility is avoided and thus blisters from this source. Still another source of blistering is conduction of water inside the roofing by the wicking action of organic fibers in the roofing material. This is eliminated in the present invention by the use of nonwicking glass fibers instead of the organic fibers usually used. Still other advantages of the roofing will be apparent from the above description.

The methods of manufacture described have the advantage that they provide uniform products of superior properties. The preferred method described for making the pipe wrap contributes to the control of the finished pipe wrap which is of great value in application and use. The method of manufacture also contributes materially to the desirable properties of the canal liner and roofing material. The method of splicing described as indicated makes possible continuous operation under conditions which impose a strain on the glass fiber filler and also makes possible the making of a finished pipe wrap in which the spliced portion of the wrap or other type of sheet is usable in the same manner as the remainder of the wrap or other type of sheet.

This invention also provides novel lamination products and methods for making the same comprising a bonded synthetic mineral wool fiber sheet or mat, containing resinous material keyed thereto, laminated to another sheet or mat by the resinous material which is keyed to said mineral wool fibers by the resinous material per se without the need for the use of auxiliary laminating agents as has been practiced heretofore in the lamination art.

Apparatus for carrying out the improved method is also provided. The apparatus permits continuous operation leading to rapid and efficient production of the glass fiber sheet filler asphalt materials.

It is apparent that many widely different embodiments of this invention may be made without departing from the spirit and scope thereof and, therefore, it is not intended to be limited except as indicated in the appended claims.

What is claimed is:

1. A method of preparing a porous glass fiber sheet base which is saturated with bituminous material comprising the steps of applying an excess of molten bituminous material by submerging in a molten bath thereof a porous bonded glass fiber sheet base having a non-thermoplastic binder to which the molten bituminous material readily adheres, the binder consisting essentially of thermoset resin and covering substantially the entire glass fiber surfaces and being tightly bonded thereto, withdrawing the glass fiber sheet base having an excess of molten bituminous material thereon from the said bath, doctoring off the excess molten bituminous material after removal of the glass fiber sheet base from the said bath by passing it between a pair of rolls including a floating doctor roll which is pivotally mounted at a point remote from the axis thereof, the sheet base being passed under and over the floating doctor roll and then away from the upper peripheral surface thereof in a direction toward the said point of mounting and in a plane substantially parallel to a plane passing through the axis of the floating doctor roll and the said point of mounting whereby the excess molten bituminous material is doctored off of the glass fiber sheet base at a substantially constant pressure and porosity visible to the unaided eye is produced in the resultant saturated glass fiber sheet base, the peripheral surfaces of the pair of rolls being rotated at substantially the linear speed of the glass fiber mat as it passes therebetween, the bituminous material that remains after doctoring off the said excess saturating the glass fiber sheet base and being bonded to the nonthermoplastic binder on the glass fiber surfaces.

2. The method of claim 1 wherein the bituminous material comprises oxidized asphalt.

3. The method of claim 1 wherein the bituminous material is a steep roofing coal tar pitch having a ring and ball softening point of at least 225° F.

4. The method of claim 1 wherein the bituminous material is a blend of oxidized asphalt and coal tar pitch, and the blend has a ring and ball softening ball point of at least 225° F.

5. The method of claim 1 wherein the bituminous material comprises oxidized asphalt, the bituminous material having a ring and ball softening point of about 240–260° F., a penetration of at least 10 at 32° F. under a load of 200 grams applied for 60 seconds, a penetration of at least 16 at 77° F. under a load of 100 grams applied for 5 seconds, a penetration of at least 25 at 115° F. under a load of 50 grams applied for 5 seconds, a ductility at 77° F. of at least 1.5 centimeters, a Cleveland open cup flash point of at least 450° F., a Cleveland open cup fire point of at least 500° F. and a solubility in carbon tetrachloride of at least 99.5%.

6. The method of claim 1 wherein the glass fiber sheet base includes a jackstraw arrangement of glass fibers which are reinforced with a plurality of continuous filament glass fibers extending lengthwise of the sheet base and generally parallel to each other.

7. The method of claim 1 wherein the glass fiber sheet base includes a jackstraw arrangement of discontinuous glass fibers which are reinforced with a plurality of continuous filament glass fibers arranged in a random swirl pattern.

8. The method of claim 1 wherein the glass fiber sheet base includes a jackstraw arrangement of glass fibers having a diameter of about 0.0006 inch to about 0.0007 inch, the sheet base is reinforced with continuous glass fiber yarn extending lengthwise thereof, the sheet base has a thermoset binder content of about 14–20% by weight, and the sheet base has a weight per square foot prior to applying the bituminous material of about 0.00855 pound to about 0.01045 pound.

9. The method of claim 1 wherein an anti-sticking material is applied to the surfaces of the saturated glass fiber sheet base after doctoring off the excess bituminous material, and thereafter it is cooled to harden the bituminous material.

10. The method of claim 1 wherein the glass fiber sheet base saturated with the bituminous material has a porosity index of about 1.8–4.2.

11. The method of claim 1 wherein the glass fiber sheet base saturated with the bituminous material has a porosity index less than 1.8.

12. The method of claim 1 wherein an excess of a second coating which is a different type of molten bituminous material is applied to the resultant porous saturated glass fiber sheet base and the excess is doctored off to provide a sheet base having a predetermined substantially uniform thickness, the second coating of bituminous material keying through the pores of the glass fiber sheet base to thereby anchor the same.

13. The method of claim 12 wherein an anti-sticking material is applied to the glass fiber sheet base after doctoring off the excess of the second coating of bituminous material, and the resulting coated glass fiber sheet base is cooled to harden the bituminous material.

14. The method of claim 13 wherein the second coating of bituminous material contains by weight at least 60% of bituminous material, up to about 7% of diatomaceous earth, up to about 12% of short fiber asbestos, and the remainder a filler selected from the group consisting of slate flour, limestone dust, and flake mica.

References Cited by the Examiner

UNITED STATES PATENTS

| | | | |
|---|---|---|---|
| 1,641,403 | 9/1927 | Van Derhoef | 156—307 |
| 2,104,082 | 1/1938 | Kirschbraun | 117—32 |

(Other references on following page)

UNITED STATES PATENTS

| | | | |
|---|---|---|---|
| 2,105,531 | 1/1938 | Greider et al. | 117—19 |
| 2,211,079 | 8/1940 | Schneider | 156—307 |
| 2,414,533 | 1/1947 | Johnston | 161—205 |
| 2,428,591 | 10/1947 | Slayter | 161—64 |
| 2,523,759 | 9/1950 | Grant | 117—92 X |
| 2,536,042 | 1/1951 | Dorfan | 117—32 |
| 2,550,465 | 4/1951 | Gorski | 161—170 |
| 2,555,401 | 6/1951 | Fasold et al. | 117—92 |
| 2,721,816 | 10/1955 | Wood | 161—155 |
| 2,732,885 | 1/1956 | Van Der Hoven | 156—371 X |

EARL M. BERGERT, *Primary Examiner.*

P. DIER, *Assistant Examiner.*